July 30, 1963   F. A. ZALAR ET AL   3,099,459
AXLE MECHANISM
Filed Aug. 8, 1960   4 Sheets-Sheet 1

INVENTORS
FRANK A. ZALAR
ROBERT K. NELSON
BY Hudson Boughton,
Williams, David & Hoffmann
ATTORNEYS July 30, 1963  F. A. ZALAR ET AL  3,099,459
AXLE MECHANISM
Filed Aug. 8, 1960  4 Sheets-Sheet 2

INVENTORS
FRANK A. ZALAR
ROBERT K. NELSON
BY Hudson, Boughton,
Williams, David & Hoffmann
ATTORNEYS

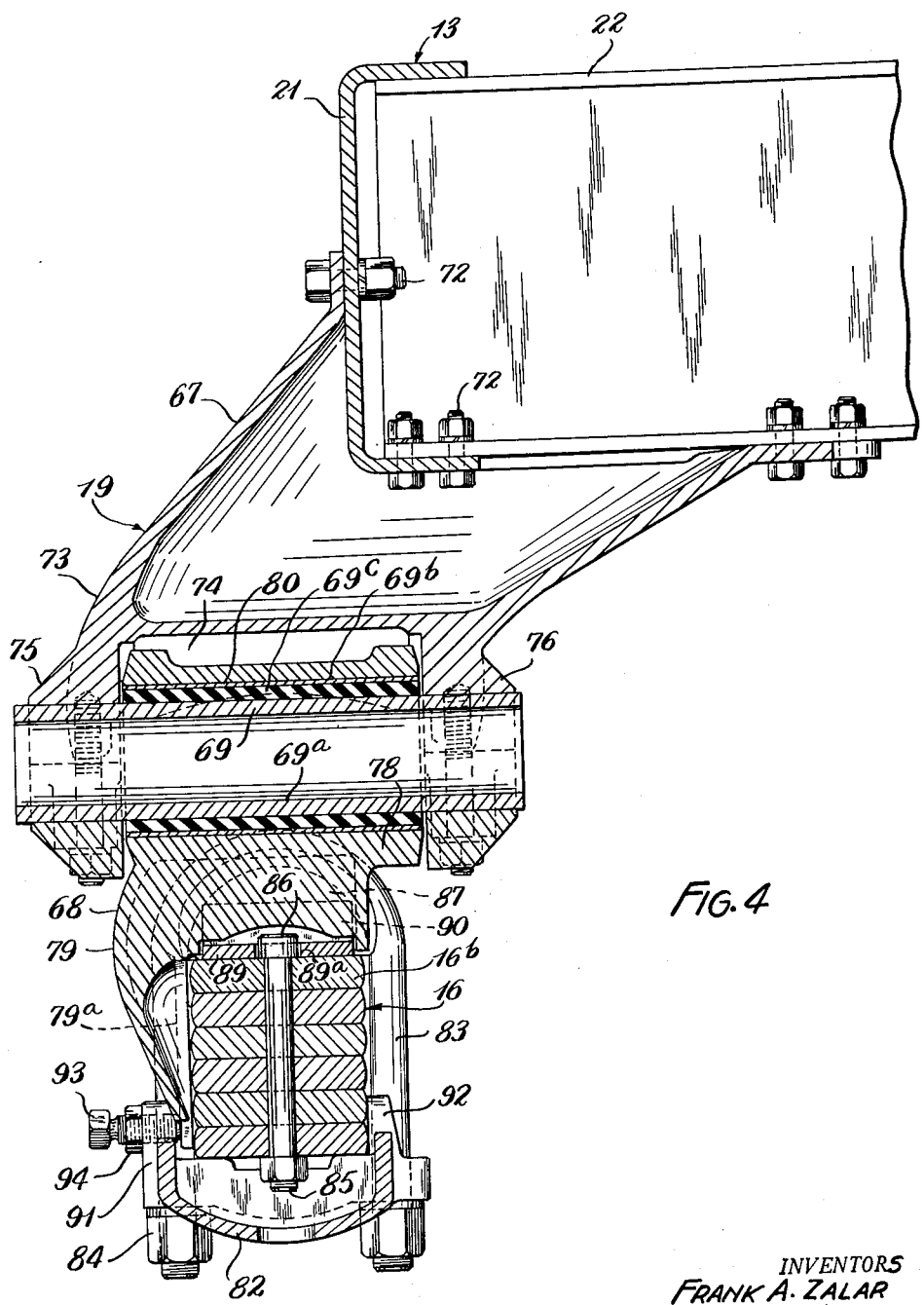

July 30, 1963    F. A. ZALAR ET AL    3,099,459
AXLE MECHANISM

Filed Aug. 8, 1960    4 Sheets-Sheet 4

INVENTORS
FRANK A. ZALAR
ROBERT K. NELSON
BY
Hudson, Boughton,
Williams, David & Hoffmann
ATTORNEYS

United States Patent Office 3,099,459
Patented July 30, 1963

3,099,459
AXLE MECHANISM
Frank A. Zalar, East Cleveland, and Robert K. Nelson, Shaker Heights, Ohio, assignors to Eaton Manufacturing Company, Cleveland, Ohio, a corporation of Ohio
Filed Aug. 8, 1960, Ser. No. 48,233
9 Claims. (Cl. 280—104.5)

This invention relates to suspension mechanism for vehicle axles and provides a novel construction by which a rugged and trouble-free suspension mechanism having good stability and a high safety factor is obtained by the use of a relatively small number of parts capable of being economically produced and readily assembled. The invention is disclosed herein in the embodiment of an axle suspension mechanism for tandem axles.

The present invention also provides axle suspension mechanisms comprising novel shackle box means for connecting an end portion of a vehicle spring with an associated axle in a manner to achieve a desired high degree of flexibility without lowering the safety factor of the mechanism.

The invention further provides axle suspension mechanism of the kind employing such a shackle box means and wherein the end portion of the spring has an enlargement confined in the box means and cushionably supported therein.

As above indicated, this invention is applicable to axle suspension mechanisms of the tandem axle type and, when so used, also comprises novel pivot means for connecting the intermediate portion of the spring with the load-receiving structure or frame of the vehicle.

Other novel characteristics and advantages of this invention will be apparent in the following detailed description and in the accompanying drawings forming a part of this specification and in which, FIG. 1 is mainly a side elevation showing the axle suspension mechanism of this invention applied to tandem vehicle axles;

FIG. 4 is a partial transverse vertical section on a somewhat larger scale and taken through the pivot means of the mechanism as indicated by section line 4—4 of FIG. 1;

Figure 1:
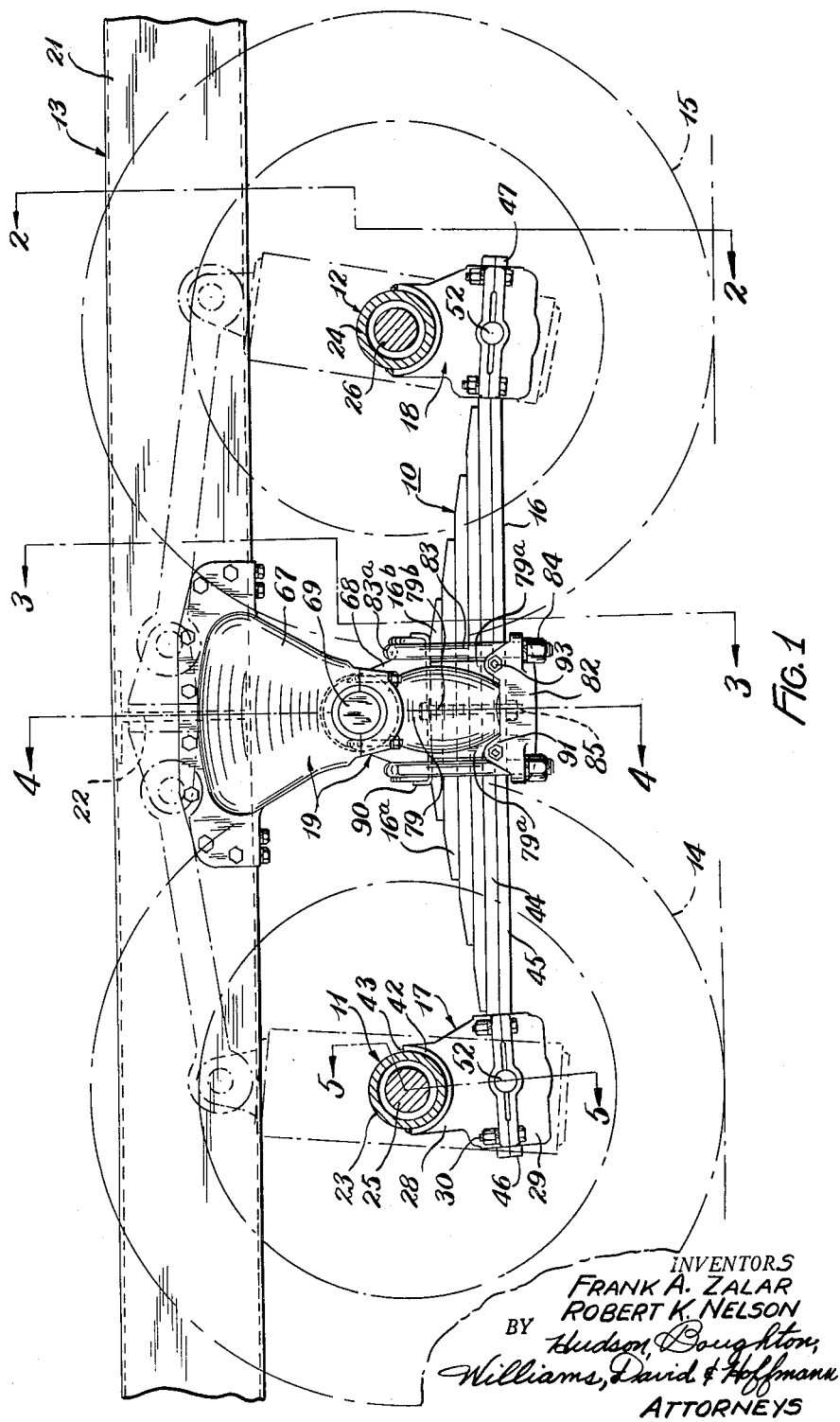
Figures 2, 3:
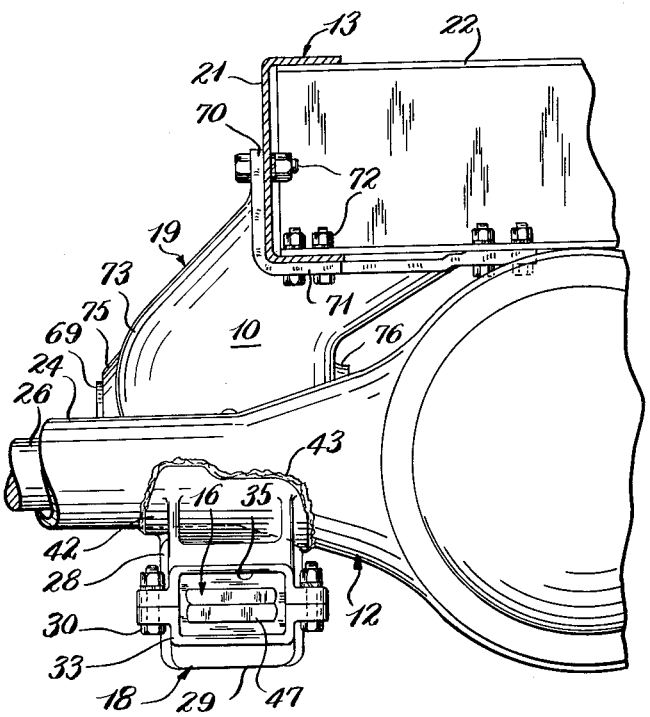
FIG. 2 is a partial rear elevation of the suspension mechanism when viewed as indicated by the directional line 2—2 of FIG. 1.
FIG. 3 is a partial transverse vertical section taken through the mechanism on section line 3—3 of FIG. 1.

The axle suspension mechanism 10 is disclosed herein as applied to tandem axles 11 and 12 of a vehicle having a load-receiving structure 13 and equipped with sets of road wheels 14 and 15 on the respective axles. The suspension mechanism 10 comprises, in general, a longitudinally extending leaf spring 16 at each side of the vehicle with the end portions thereof connected with the axles 11 and 12 by shackle box devices 17 and 18, and pivot devices 19 connecting the intermediate portions of the springs 16 with the vehicle structure 13.

The load-receiving structure 13 of the vehicle is here shown as comprising channel-shaped longitudinal side frame members 21, and transverse frame members 22 connected with such side frame members and extending therebetween. The axles 11 and 12 can be any suitable form of tandem axles and are here shown as being live or driving axles comprising transversely extending axle housings 23 and 24 and axle shafts 25 and 26 disposed in such housings and having driving connection with the wheels 14 and 15.

The shackle box devices 17 and 18 are connected to the respective axles 11 and 12 in a rigid relation thereto as will be further explained hereinafter and, since both of these devices are of the same construction, only one of them, namely the shackle box device 17, need be described in detail. The shackle box device 17 comprises upper and lower box members or housing sections 28 and 29 suitably connected together, as by means of bolts 30, so as to form a hollow housing or box structure containing a chamber 31 enclosed at the top, bottom and sides thereof by pairs of opposed walls, and also having end portions 32 and 33 provided with openings or slots 34 and 35 in communication with the chamber 31. The pairs of opposed walls just referred to comprise top and bottom walls 37 and 38 and a pair of outer and inner side walls 39 and 40.

The upper box member 28 is provided with an upwardly projecting hollow bracket portion 42 which is secured to the axle housing 23, in this case by welding 43, for connecting the shackle box device 17 with the axle 11 in the above-mentioned rigid relation thereto. When the shackle box devices 17 and 18 are connected to the axles 11 and 12 by such upwardly projecting bracket portions 28, these devices will be located immediately beneath their associated axles so as to contribute toward the attainment of good stability for the axle suspension mechanism 10 and a lowered center of gravity for the vehicle.

The spring 16 is a leaf spring comprising a stack of spring leaves 16ª of which the two lower leaves 44 and 45 project beyond the other leaves and provide the spring with front and rear end portions 46 and 47 which extend into the shackle box devices 17 and 18 through the slots 34 in the adjacent ends of those devices as access slots leading into the chambers 31. The intermediate portion 16ᵇ of the spring 16 forms an attachment portion to which the pivot device 19 is secured as is explained hereinafter.

Figure 6:
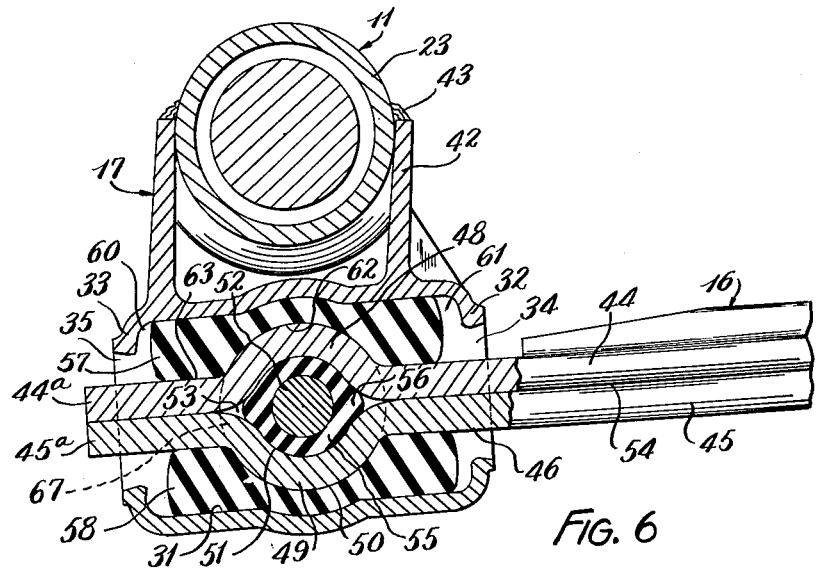
FIG. 6 is a partial longitudinal vertical section taken on section line 6—6 of FIG. 5.
Figure 5:
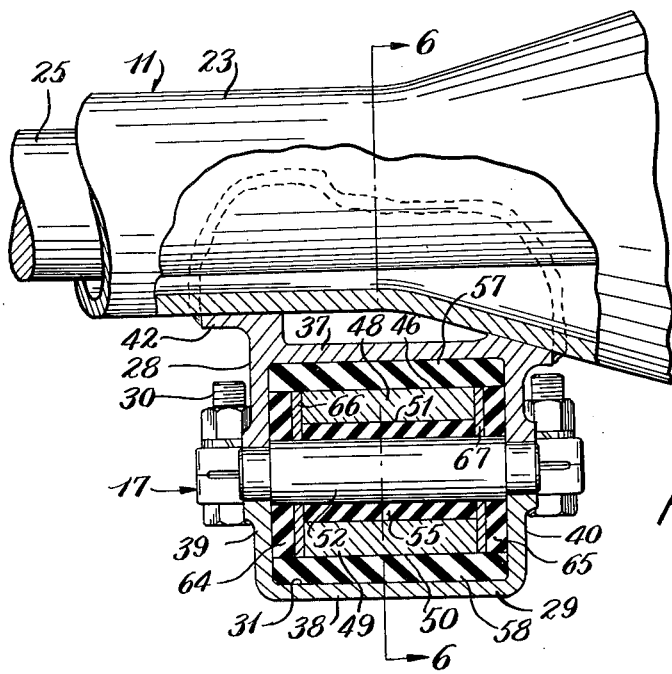
FIG. 5 is a transverse vertical section taken through a shackle box of the mechanism as indicated by section line 5—5 of FIG. 1.

As shown in FIGS. 5 and 6, the spring leaves 44 and 45 are provided with co-operating bowed portions 48 and 49 forming an enlargement portion or spring eye 50 on the end portion 46 of the spring 16. The enlargement portion 50 is located in the chamber 31 and has an opening or passage 51 therein extending transversely of the end portion 46 for receiving a tracking pin 52 by which the end portion 46 is flexibly connected with the shackle box device 17. The tracking pin 52 is mounted in the side walls 39 and 40 by having the end portions thereof clampingly held between the connected box members 28 and 29.

The passage 51 of the enlargement portion 50 is of an oblong or substantially elliptical cross-sectional shape as shown in FIG. 6 by reason of the fact that it includes crevice portions 53 along opposite sides thereof and which are substantially centered on a common plane 54 defined by the face-to-face engagement of the adjacent flat surfaces of the two spring leaves 44 and 45. The passage 51 is of a substantially larger transverse dimension than the diameter of the tracking pin 52 so as to accommodate a flexible bushing 55 of rubber-like material comprising rubber or a suitable plastic therebetween. The bushing 55 is likewise of an oblong or substantially elliptical cross-sectional shape by reason of its having lobe portions 56 on opposite sides thereof which engage in the crevices 53.

When the bushing 55 has the oblong or elliptical form just above referred to, it will hold its original shape to much better advantage and will retain that shape during a prolonged period of service because there will be less likelihood of the opposite side portions of the bushing being pulled out of shape by the pushing and pulling forces acting between the enlargement portion 50 and the tracking pin 52. Since the lobe portions 56 of the bushing 55 already occupy to a substantial extent the space of the crevices 54, the tendency of the pin 52 to deflect or pull out the sides of the bushing will be reduced to a minimum, and consequently, the bushing will retain its original form and is not likely to become permanently distorted or work-hardened.

The end portion 46 of the spring 16 is also flexibly connected with, and supported in, the shackle box device 17 by the provision of yieldable spring pads or cushion blocks 57 and 58 in the chamber 31 above and below the enlargement portion 50. The cushion blocks 57 and 58 are made of a suitable flexible rubber-like material and are molded to a preformed shape corresponding with and substantially filling the upper and lower portions of the chamber 31, so far as the tranverse cross-sectional shape of the chamber is concerned. The cushion blocks 57 and 58 are preferably of a somewhat shorter length than the chamber 31, however, so that portions of the chamber adjacent the end openings 34 and 35 will provide accommodation spaces 60 and 61 into which portions of the cushion blocks can expand or flow when these blocks are distorted by the end portion 46 of the spring as the result of suspension loading or articulation loading imposed thereon.

The preformed shape of the cushion blocks 57 and 58 is such that portions of these blocks follow the convex contour and hug the enlargement portion 50 and, for this purpose, the adjacent sides of the blocks have correspondingly curved recesses 62 molded therein. On opposite sides of the curved recesses 62, the blocks 57 and 58 have flat surface portions 63 which lie against the upper and lower flat surface portions of the spring leaves 44 and 45.

As shown in FIGS. 5 and 6, the chamber 31 is defined in part by recesses preformed in the upper and lower housing members 28 and 29 and facing toward the spring 16 from opposite sides of the latter. The cushion blocks 57 and 58 are seated in these recesses of the housing members, and the engagement of the blocks with the spring leaves 44 and 45 holds the leaves in face-to-face engagement with each other.

For flexibly cushioning the thrust occurring in a lateral direction between the end portion 46 and the shackle box device 17, other flexible cushion members 64 and 65 are provided in the chamber 31 and are interposed between the side edges of the enlargement portion 50 and the side walls 39 and 40. The cushion members 64 and 65 preferably have the shape of preformed washers made of suitable rubber-like material and disposed in a surrounding relation to the tracking pin 52. The lateral thrust of the enlargement portion 50 is preferably applied to the cushion members 64 and 65 through suitable interposed metal washers 66 and 67 which also serves to confine the bushing 55 in the passage 51.

The end portion 46 of the spring 16 is preferably of a length to extend through both of the end openings 34 and 35 of the shackle box device 17 and across the chamber 31. This is achieved by providing the spring leaves 44 and 45 with straight extension portions 44$^a$ and 45$^a$ beyond the enlargement portion 50 and which project through the remote end opening or slot 35 as a clearance opening. If desired, however, the extension portions 44$^a$ and 45$^a$ of the spring leaves 44 and 45 can be omitted as well as the end opening 35 and, in that case, the left end portion 33 of the shackle box device 17 will be closed or blind and the portions of the cushion blocks 57 and 58 on that side of the tracking pin 52 will come into a meeting engagement on the common plane 54.

The access opening 34 of the shackle box device 17, and the clearance opening 35 thereof when provided, are of a narrower height than the vertical transverse dimension or thickness of the enlargement portion 50 so that the latter will always be confined in the chamber 31 and withdrawal of the enlargement portion from the device, in the event of failure of the tracking pin 52, will be prevented. By this means the construction of the shackle box device 17 contributes to a desired high safety factor for the suspension mechanism 10. If the tracking pin 52 should fail, any attempt of the enlargement portion 50 to escape from the chamber 31 would result in this enlargement portion coming into engagement with one or the other of the end portions 32 and 33 of the box structure inasmuch as the enlargement portion is too thick to pass through either of the openings 34 and 35.

In connection with any such tendency for the enlargement portion 50 to be withdrawn through the opening 34, it is also pointed out that the extension portions 44$^a$ and 45$^a$ of the spring leaves 44 and 45 will co-operate with the tracking pin 52 and be spread apart thereby, with the result that the vertical transverse dimension or thickness of the enlargement portion 50 will be thus further increased during any such withdrawal tendency. This spreading apart of the spring leaves 44 and 45 by the tracking pin 52 will be effective for either direction of longitudinal relative movement of the spring 16 and, as long as the enlaregment portion remains adjacent one or the other of the end openings 34 and 35, it will have the above-mentioned increased thickness for further preventing the same from passing through either of these openings.

Reverting now to the pivot means 19 by which the intermediate portion of the spring 16 is connected with the vehicle structure 13, it is explained that this pivot means comprises upper and lower pivot members 67 and 68 and transverse pivot pin means 69 pivotally connecting the same.

The upper pivot member 67 comprises angularly disposed bracket portions 70 and 71 on the upper end thereof forming a saddle means in supporting engagement with the frame members 21 and 22 and connected therewith as by suitable bolts 72. The upper pivot members 67 also comprises a depending hollow knee portion 73 having a space or recess 74 therein, and pivot elements in the form of clamping portions 75 and 76 located in a spaced-apart pivot member 67 can be of any suitable material but is relation at oposite sides of the recess 74. This upper preferably constructed as a casting made of aluminum or other light-weight metal.

The lower pivot member 68 comprises an upper block portion 78 seated upon the upper side of the intermediate portion 16$^b$ of the spring 16 and a depending side wall or cheek portion 79 lying adjacent or against the outer side of the stack of leaves comprising the spring. The block portion 78 projects into the recess 74 between the clamping portions 75 and 76 of the upper pivot member 67 and is provided with a transverse opening or passage 80 which is substantially aligned with the openings of such clamping portions. The pivot pin 69 extends through the transverse opening 80 of the block portion 78 and has the opposite ends thereof held in the clamping portions 75 and 76 of the upper pivot member 67.

The pivot pin 69 is here shown as being of the composite type comprising an inner hollow shaft or sleeve 69$^a$, an outer coaxial sleeve 69$^b$ and a bushing 69$^c$ of rubber-like material comprising rubber or a suitable plastic confined therebetween. The yieldable bushing 69$^c$ is preferably in an axially-prestressed condition between the inner and outer sleeves 69$^a$ and 69$^b$. The bushing 69$^c$ accommodates the pivotal movements between the pivot members 67 and 68 and also accommodates a limited extent of tilting movement between these pivot members.

The lower pivot member 68 also comprises attaching means for attaching the same to the intermediate portions 16$^b$ of the spring 16 and which attaching means is here shown as comprising a lower clamping member or spring plate 82 engaging the underside of the spring and held thereagainst by U-bolts 83 whose curved upper portions 83$^a$ embrace, or lie in, grooved end portions provided on the opposite ends of the block portion 78. The lower ends of the U-bolts 83 extend through the clamping member 82 and have securing nuts 84 applied thereto.

The leaves of the spring 16 are also retained in their assembled and stacked relation by a clamping bolt 85 extending therethrough and having a head 86 on the upper end thereof which lies in a recess 87 formed in the underside of the block portion 78. Relative longitudinal shifting between the lower pivot member 68 and the spring 16 is prevented by a retaining member 89 interposed between the block portion 78 and the spring and engaged with the head 86. The retainer member 89 is here shown as being a flat clip lying against the top surface of the uppermost leaf of the spring 16 and having an opening 89ª in which the head 86 is received. The retainer member 89 has up-turned end portions or flanges 90 thereon, as shown in FIG. 1, and is of a length so that these flanges are located in holding engagement with the opposite ends of the block portion 78.

The clamping member 82 is substantially C-shaped in cross-section, as shown in FIG. 4, so as to embrace the lower portion of the spring 16 and is provided on the outboard and inboard sides thereof with pairs of upstanding longitudinally spaced lugs 91, 92. The cheek portion 79 of the lower pivot member 68 has flat-plate portions or thrust seats 79ª at the ends thereof which lie on opposite sides of, and are integral with, a bowed intermediate portion 79ᵇ. The lugs 91 of the clamping member 82 lie opposite the thrust seats 79ª and are provided with clamping screws 93.

The action of the screws 93 against the thrust seats 79ª push the latter against the outer side of the stack of spring leaves and, at the same time, cause the lugs 92 to be drawn against the inner side of the stack. The screws 93 are retained in their clamping position by suitable locknuts 94 thereon.

When the lower pivot member 68 is connected with the spring 16 by being seated on the top of the intermediate portion 16ᵇ thereof as described above, it will be observed that the load of the vehicle structure 13 will be transmitted directly to the spring rather than through the U-bolts 83. Although the position of the lower pivot member 68 in seating engagement with the top of the spring 16 tends to cause the pivot pin 69 to be elevated somewhat, this condition is offset by the fact that the shackle box devices 17 and 18 are located beneath their associated axles 11 and 12 so that the overall result is the achievement of the above-mentioned desired low center of gravity for the vehicle and a good operating stability for the suspension mechanism 10.

From the accompanying drawings and the foregoing detailed description it will now be recognized that this invention provides a novel and highly practical axle suspension mechanism for vehicles, and particularly for vehicles employing tandem axles, by which a desired high degree of flexibility, a high stability and a high safety factor are achieved among the various important advantages already pointed out above.

Although the axle suspension mechanism of this invention has been illustrated and described herein to a somewhat detailed extent, it will be understood, of course, that the invention is not to be regarded as being limited correspondingly in scope but includes all changes and modifications coming within the terms of the claims hereof.

Having described our invention, we claim:

1. In suspension mechanism for a vehicle having longitudinal frame means carrying a longitudinally extending lower corner portion on the outboard side thereof, a pair of spaced tandem axles, a longitudinally extending spring spanning the space between said axles and comprising a stack of spring leaves, means connecting the end portions of said spring with said axles, an upper pivot member comprising angularly disposed upper bracket portions adapted to be secured to said frame means in a straddling relation to said lower corner portion and a depending hollow knee portion projecting downwardly and laterally outwardly relative to said corner portion and having pivot elements spaced apart transversely of the intermediate portion of said spring, a lower pivot member comprising block means seated against the upper side of said intermediate portion and depending cheek means connected with said block means and lying adjacent one upright side of said stack, U-bolt means embracing said stack and connecting said lower pivot member with said intermediate portion, pivot pin means having end portions projecting from said block means and engaged by the pivot elements of said knee portion, a clamp member secured against the underside of said intermediate portion of the spring by said U-bolt means and carrying adjustable thrust means effective against portions of said cheek means, and locating means on said clamp member and engaging the other upright side of said stack and held thereagainst by the action of said thrust means.

2. In suspension mechanism for a vehicle having a load-receiving structure including a frame member having a longitudinal lower corner portion on the outboard side thereof, a pair of spaced tandem axles, a longitudinally extending spring spanning the space between the axles and having the end portions thereof connected with said axles, an upper pivot member comprising a saddle-shaped portion adapted to be secured to said structure in a straddling relation to said corner portion and a hollow knee portion connected with said saddle-shaped portion and projecting downwardly and laterally outwardly relative to said corner portion and having laterally spaced hollow clamp portions thereon, pivot pin means extending transversely of said spring and having end portions thereof held in said clamp portions, said spring comprising a stack of spring leaves, a lower pivot member on the intermediate portion of said spring and comprising block means seated on the upper side of said stack and projecting into said knee portions between said clamp portions and provided with a transverse opening through which said pin means extends, torsionally flexible bushing means received in said opening and embracing said pin means, spaced U-bolts embracing portions of said block means for securing said lower pivot member on said spring, and cheek means rigid with and depending from said block means at a location between said U-bolts, said cheek means lying against the outboard side of said stack and extending thereacross for substantially the full height of the stack.

3. In axle suspension mechanism for vehicles; an axle; a shackle having a hollow box portion comprised of connected wall portions including a pair of side walls, and an attaching portion rigidly connecting said box portion with said axle; said box portion containing a chamber and having slots in the ends thereof communicating with said chamber; a leaf spring having an end portion comprised of two adjacent spring leaves and extending through said slots and across said chamber; said leaves having co-operating bowed portions defining an enlargement portion located in said chamber and containing a passage extending transversely of said one end portion; pin means mounted in said side walls and extending through said passage for flexibly connecting said one end portion with said box portion; cushion means comprising upper and lower cushion blocks located in said chamber and having said one end portion cushionably received therebetween; and flexible bushing means located in said passage in surrounding relation to said pin means; said passage having crevice recesses at opposite sides thereof and said bushing means having lobe portions engaged in said recesses; said leaves being subject to a spreading action by said pin means for producing a spread condition of said bowed portions upon failure of said cushion means; the height of said slots in relation to the spread condition of said bowed portions being such as to prevent movement of said bowed portions through either of said slots.

4. Axle mechanism as defined in claim 3 and comprising other cushioning members interposed between said enlargement portion and said side walls.

5. Axle mechanism as defined in claim 3 wherein said bushing means is substantially coextensive with said passage along the axis of said pin means; metal washers on said pin means on opposite sides of said enlargement portion and confining said bushing means in said passage; and other cushion members surrounding said pin means and interposed between said washers and said side walls.

6. In axle suspension mechanism for vehicles, an axle, a leaf spring having a connecting portion formed by leaf end portions of a pair of the leaves thereof, a shackle box secured on said axle, said box comprising connected top and bottom housing members and having wall portions including a pair of spaced side walls and a chamber substantially enclosed by said wall portions, said chamber being defined in part by preformed recesses in said housing members facing toward said leaves from above and below the latter, said box also having slots in the ends thereof in communication with said chamber, said leaf end portions extending through both of said slots and across said chamber between said recesses and having co-operating oppositely bowed portions forming an enlargement on said connecting portion and located in said chamber, said enlargement having a lateral passage extending therethrough transversely of said connecting portion, a pin mounted in said side walls and received in said passage for pivotally connecting the spring with said box, and cushioning medium in said chamber in an embracing relation to said connecting portion and enlargement including cushion blocks above and below said leaves and seated in said recesses and normally retaining said leaves in face-to-face engagement, said pair of leaves being subject to a spreading action by said pin for producing a spread condition of said bowed portions upon failure of said cushioning medium, the height of said slots in relation to the spread condition of said bowed portions being such as to prevent movement of said bowed portions through either of said slots.

7. Axle suspension mechanism as defined in claim 6 and comprising a flexible bushing in said passage in a surrounding relation to said pin and embraced by said bowed portions.

8. In axle suspension mechanism for vehicles, an axle, a leaf spring having a connecting portion formed by leaf end portions of a pair of the leaves thereof, a shackle box secured on said axle, said box comprising connected housing members and having wall portions including a pair of spaced side walls and a chamber substantially enclosed by said wall portions, said box also having slots in the ends thereof in communication with said chamber, said leaf end portions extending through both of said slots and across said chamber and having co-operating oppositely bowed portions forming an enlargement on said connecting portion and located in said chamber, said enlargement having a lateral passage extending therethrough transversely of said connecting portion, a pin mounted in said side walls and received in said passage for pivotally connecting the spring with said box, and cushioning medium in said chamber in an embracing relation to said connecting portion and enlargement, said pair of leaves being subject to a spreading action by said pin for producing a spread condition of said bowed portions upon failure of said cushioning medium, the height of said slots in relation to the spread condition of said bowed portions being such as to prevent movement of said bowed portions through either of said slots, said passage being oblong in cross-sectional shape and having extension recesses on opposite sides thereof with respect to the lengthwise direction of said spring, said bushing having lobe portions on opposite sides and externally thereof and engaged in said extension recesses.

9. In axle suspension mechanism for vehicles, an axle, a leaf spring having a connecting portion formed by leaf end portions of a pair of the leaves thereof, a shackle box secured on said axle, said box comprising connected housing members and having wall portions including a pair of spaced side walls and a chamber substantially enclosed by said wall portions, said box also having slots in the ends thereof in communication with said chamber, said leaf end portions extending through both of said slots and across said chamber and having co-operating oppositely bowed portions forming an enlargement on said connecting portion and located in said chamber, said enlargement having a lateral passage extending therethrough transversely of said connecting portion, a pin mounted in said side walls and received in said passage for pivotally connecting the spring with said box, and cushioning medium in said chamber in an embracing relation to said connecting portion and enlargement, said pair of leaves being subject to a spreading action by said pin for producing a spread condition of said bowed portions upon failure of said cushioning medium, the height of said slots in relation to the spread condition of said bowed portions being such as to prevent movement of said bowed portions through either of said slots, said connecting portion having longitudinally spaced flat areas on the top and bottom thereof and located on opposite sides of said enlargement, said cushioning medium comprising upper and lower cushion blocks having recessed intermediate portions engaged by said enlargement and end portions engaged by said flat areas.

References Cited in the file of this patent

UNITED STATES PATENTS

| | | |
|---|---|---|
| 1,586,164 | Tait | May 25, 1926 |
| 2,002,852 | Divney | May 28, 1935 |
| 2,073,639 | Kliesrath | Mar. 16, 1937 |
| 2,437,158 | Heiney | Mar. 2, 1948 |
| 2,481,891 | Van Raden | Sept. 13, 1949 |
| 2,559,103 | Anderson | July 3, 1951 |
| 2,635,869 | Jurgens | Apr. 21, 1953 |
| 2,741,491 | Van Raden | Apr. 10, 1956 |
| 2,748,879 | Bailey | June 5, 1956 |
| 2,810,587 | Boughner | Oct. 22, 1957 |
| 2,929,618 | Hutchens | Mar. 22, 1960 |
| 2,951,709 | Ward | Sept. 6, 1960 |